United States Patent [19]

Findley

[11] 4,130,251
[45] Dec. 19, 1978

[54] COMBINATION TROLLING AND CASTING REEL

[76] Inventor: Jack R. Findley, 5921 Cherrywood Ter., Greenbelt, Md. 20770

[21] Appl. No.: 889,034

[22] Filed: Apr. 11, 1978

Related U.S. Application Data

[63] Continuation-in-part of Ser. No. 806,691, Jun. 15, 1977, abandoned.

[51] Int. Cl.$^2$ .................... A01K 89/015; A01K 89/01
[52] U.S. Cl. .......................... 242/84.2 C; 242/84.1 R; 242/84.2 R; 308/238; 308/DIG. 4
[58] Field of Search ..................... 242/84.2 C, 84.2 B, 242/84.53, 84.2 R, 84.1 R, 68.3; 308/DIG. 10, DIG. 4, 238, 237, 339, 203

[56] References Cited

U.S. PATENT DOCUMENTS

| | | | |
|---|---|---|---|
| 1,114,084 | 10/1914 | Wells | 242/84.2 B |
| 2,034,917 | 3/1936 | Miller | 242/84.2 C |
| 2,621,869 | 12/1952 | McCash | 242/84.2 B |
| 2,744,693 | 5/1956 | Albert | 242/84.2 B |
| 2,746,694 | 5/1956 | Kauppi | 242/84.2 B |

*Primary Examiner*—Billy S. Taylor

*Attorney, Agent, or Firm*—Lane, Aitken, Dunner & Ziems

[57] ABSTRACT

A fishing reel is adapted to be shifted between casting and trolling modes and includes a housing, a spool which includes a line portion around which fishing line can be wound and which is adapted for rotation about an axis relative to the housing, and rotating means for rotating the spool. A first bearing means is provided for mounting the spool on the housing on one side of the line portion. There is a space between the entire spool surface and housing on the other side of the line portion at least wide enough to accommodate a strand of fishing line. The first bearing means includes means for accommodating movement of the spool between the normal axial position and a second position where the spool will engage the housing when pressure is exerted on the spool and return to said normal position when the pressure is relieved. The housing includes an opening therein located to allow the fishing line to be shifted between the trolling mode whereby the line is generally perpendicular to the spool axis and the casting mode whereby the line will unwind generally axially from the spool through the space.

9 Claims, 6 Drawing Figures

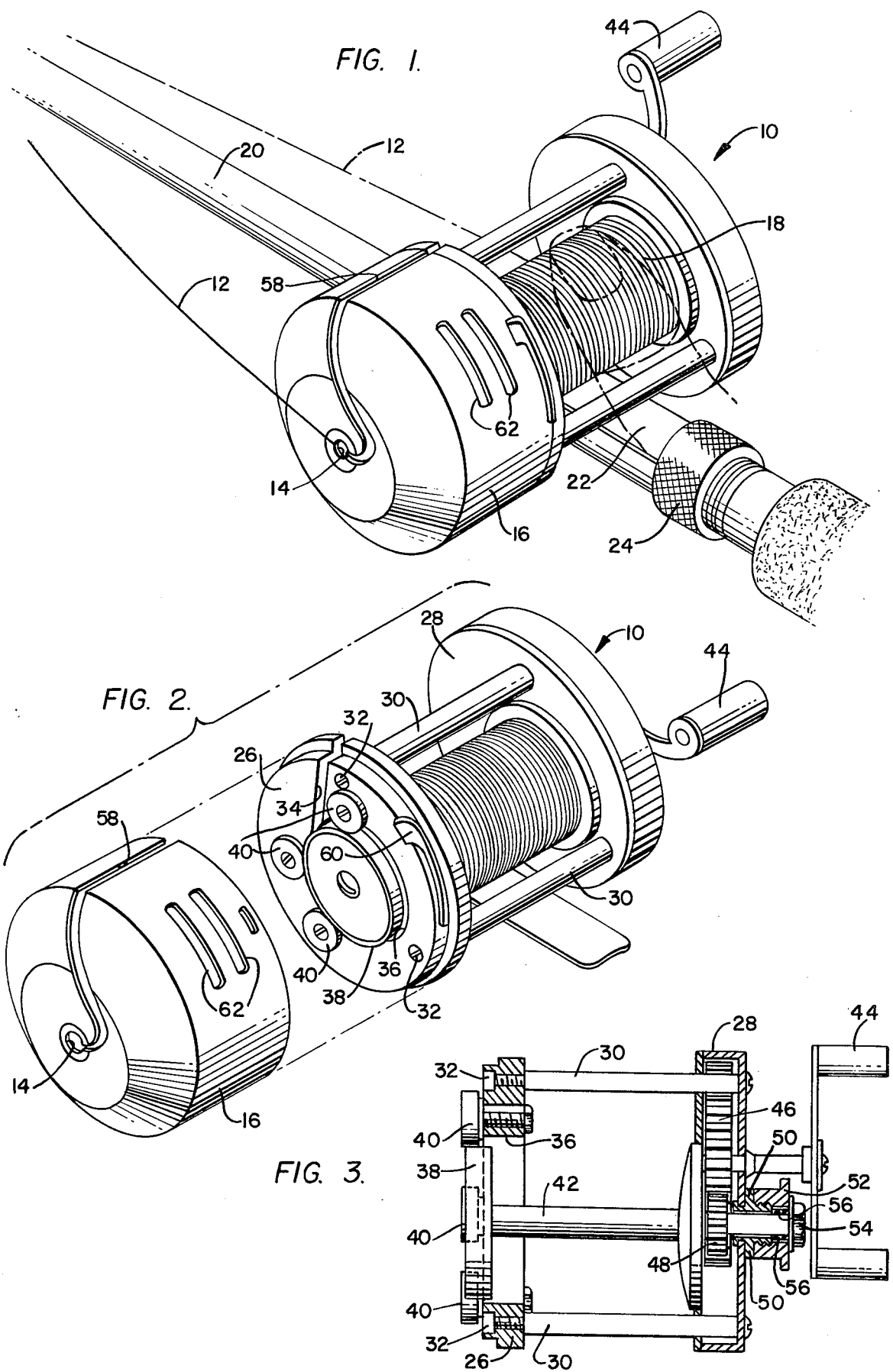

COMBINATION TROLLING AND CASTING REEL

CROSS REFERENCE TO RELATED APPLICATION

This application is a continuation-in-part of Ser. No. 806,691, filed June 15, 1977, and now abandoned.

BACKGROUND OF THE INVENTION

This invention relates to fishing reels and, more particularly, to a reel which combines the advantageous features of standard trolling and casting reels.

Different types of fishing reels are designed to be used under different conditions. For example, one popular type of reel is known as a casting reel where a line unwinds generally axially from a spool which does not move. This type of reel is designed to prevent the line from backlashing and becoming hopelessly tangled during casting. However, because casting reels can only provide support for the spool at one end so the line can unwind from the other end, casting reels are primarily used for light fishing and not designed to be used for heavy fishing such as, for example, surf fishing where larger fish are usually caught.

Another type of popular reel is known as a trolling reel where the line is wound and unwound generally perpendicular to the spool axis by turning the spool by means of a crank. Although this type of reel can be used for casting, one disadvantage is that backlashing oftentimes occurs which requires a tedious untangling process. Because of the way the line winds and unwinds, the spool can be supported at both ends so that trolling lines can advantageously be used for heavy fishing where there is a direct dead pull on the reel.

Numerous attempts have been made to combine the best features of these two types of reels. One common way of providing such a combination reel is to have a reel which can be rotated on the fishing rod so that when the line is casted it will unwind axially from the spool. The reel is then rotated about a pivot point so that the line is wound back onto the spool perpendicular to the spool axis. Such reels are shown in U.S. Pat. Nos. 744,454 and 2,604,272. However, these types of combination reels undesirably require extra moving parts which are required to enable the spool to be rotated before and after casting.

Other types of combination reels have been developed such as, for example, those shown in U. S. Pat. Nos. 2,034,917, 2,551,320, 2,621,869 and 3,089,663. The reels in those patents, however, cannot be used for the so-called heavy fishing because the spools are anchored only at one end so that if too much force is exerted by a heavy fish the spool cannot withstand the stress.

Other types of adaptations have been provided such as the ones shown in U.S. Pat. No. 3,745,684 and British Pat. No. 20,609 (1902), where foldable guides are provided to allow the line to unwind axially from a spool during casting, the guide being foldable out of the way so that the line can be reeled in by turning the spool and receiving the line perpendicular to the spool axis. However, these reels just further complicate the casting and winding procedure and add more weight and additional movable parts to the fishing rod.

SUMMARY OF THE INVENTION

The problems discussed above have been solved by the inventive combination reel which utilizes the standard heavy duty design of a trolling reel where the spool is supported at both ends, but adapts it in such a way that the fishing line during casting can be unwound axially from the spool. This is accomplished by rotatably mounting one end of the spool to the reel housing, preferably on the side on which the spool crank is located. The other end of the spool is not mounted on the housing, but there is an annular opening around the end of the spool so that the line can unwind axially from the spool during casting. The housing includes a slot through which the fishing line can be transferred from a normal trolling position perpendicular to the spool to a casting position where the line projects axially from the spool.

The end of the spool around which the annular opening is located is normally not connected to the housing. A plurality of roller bearings can be spaced apart around the housing which cooperate with a bearing surface on the spool. However, the roller bearings are not necessary in the lighter weight reels and for those reels no bearing means needs to be provided on that side of the spool. The connection between the spool and housing on the opposite side of the spool is provided with a flexible bearing such as, for example, a rubber insert or spring in the bearing, so that the other end of the spool is flexible or movable from its normal position relative to the spool axis. In this way when a force is exerted on the spool (through the line or by the fisherman's thumb) the spool will engage the roller bearings or housing.

With this arrangement, during the casting mode the line can be transferred through the slot in the housing so that the line will unwind axially from the spool such as with standard casting reels. The thumb is placed on the spool and the flexible bearing allows the end of the spool opposite the flexible bearing to engage the housing or roller bearings and prevent the line from pulling off the spool. In order to cast, the thumb is lifted and the flexible bearing will automatically return the spool to its normal axial position and allow the line to freely unwind. After the cast has been made, the line is passed back through the slot and in a position perpendicular to the spool, in the trolling mode, so that in order to unwind a greater amount the line will have to move perpendicular to the spool axis.

Should a fish strike the line, the force exerted through the line onto the spool will cause the spool, through its flexible bearing arrangement mentioned above, to engage the roller bearings, if they are used, so that the spool is engaged on both ends to withstand the weight of a heavy fish. In this position the reel operates as a normal trolling reel so that the fish can be landed without having to worry about the reel not being able to withstand the weight of the fish. After the weight has been relieved, the spool will automatically return to its normal position whereby the spool roller surface does not engage the roller bearings and another cast can take place. In lighter reels the roller bearings are not necessary and the flexible bearing is sufficient by itself to support the spool.

As can be seen, the best features of both trolling and casting reels are combined. Casting can take place without the spool turning so that backlashes are eliminated. In addition, the spool is supported at both ends in the trolling mode so that when a fish is being reeled in there is no concern about the reel being able to withstand the weight of the fish because of the heavy-duty nature of the reel. The standard design of a trolling reel can be utilized without having to sacrafice any of its advantageous features and still provide a casting mode which eliminates backlash.

BRIEF DESCRIPTION OF THE DRAWINGS

For a better understanding of the invention, reference may be had to the following description of a preferred embodiment taken in conjunction with the accompanying drawings in which:

FIG. 1 is a perspective view of the combination trolling and casting reel mounted on a rod with the line in the casting mode;

FIG. 2 is a perspective view of the reel, but with the split bell removed from the housing to illustrate the roller bearings and their cooperating bearing surface connected to the spool;

FIG. 3 is a cross-sectional view of the reel showing in particular a flexible bearing formed with a rubber insert and the arrangement of the roller bearings and their cooperating bearing surface;

DETAILED DESCRIPTION OF A PREFERRED EMBODIMENT

Figure 4:
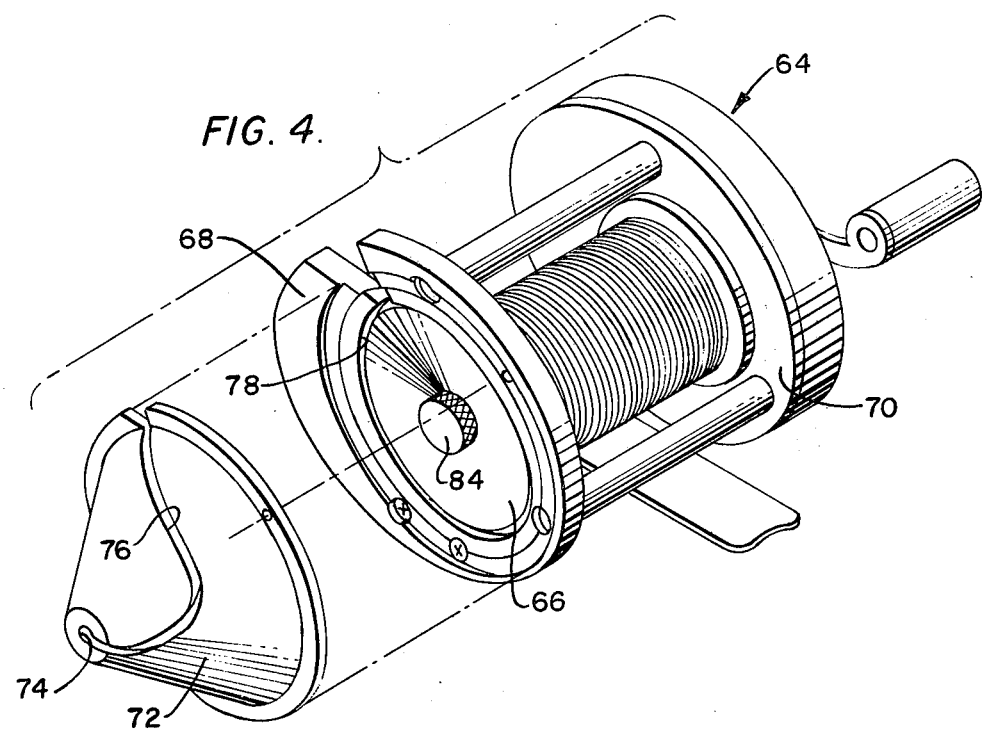
FIG. 4 is a perspective view of an alternative design in which a flexible bearing with a spring insert can be utilized and no bearings on the other side of the spool are provided.

Referring now to FIG. 1, reference numeral 10 is used to designate generally the combination casting and trolling reel. As shown, fishing line 12 is in the casting mode and projects outwardly from the side of the reel 10 through an opening 14 in a split bell 16, the structure of which is described in greater detail below. In this way, as will be described in greater detail below, the line 12 can axially unwind from a spool 18, which enables the line 12 to be casted while the spool 18 remains stationary. As further shown in FIG. 1, the reel 10 is mounted on a rod 20 in a standard way using a reel stand 22 and screw-on ring supports 24.

In order to provide a better understanding of the operation of the reel 10, FIG. 2 shows the reel 10 with the split bell 16 removed so that the internal mechanism can be seen. The reel 10 is formed of a housing which includes a tail plate 26 and an end plate assembly 28 which are connected by means of pillars 30 and screws 32.

The tail plate 26 is provided with a slot 34 which communicates the outer surface of the tail plate 26 with an annular opening 36 which defines the inner surface of the tail plate 26. A roller bearing surface 38 connected to the spool 18 is located inside the annular opening 36 and sized so that there is an annular space therebetween. A plurality of roller bearings 40 are mounted on the outer side of the tail plate 26 and cooperate with the bearing surface 38 in a way which will be described in detail below.

Referring now to FIG. 3, the spool 18 includes a shaft 42 which extends between the tail plate 26 and the end plate assembly 28. A crank 44 is connected to the shaft 42 through gears 46 and 48 so that the shaft 42 can be turned for winding and unwinding the line 12. The shaft 42 is connected to the end plate assembly 28 by means of a flexible bearing so that the spool 18 is flexible and can move relative to the shaft axis. The shaft 42 projects outwardly from the end plate assembly 28 through a bushing 50 and spacer 52. The outer end of the shaft 42 is threaded to receive a nut 54. There is a small space between the bushing 50 and the shaft 42. There is a larger space between the spacer 52 and the shaft 42 in which a rubber bearing 56 is located. The rubber bearing 56, operating in conjunction with the space between the bushing 50 and the shaft 42, allows the other end of the shaft 42 to be moved relative to its axis and provide, what is called above, a flexible spool. As mentioned above, on the other side of the shaft 42 there is an annular space (preferably about a millimeter) between the roller bearings 40 and the bearing surface 38. As can be seen from the location of the roller bearings 40 in FIG. 2, should a force be exerted against the spool 18 the bearing surface 38 will move toward the roller bearings 40 that the engage and provide a bearing surface on both sides of the shaft. In lighter weight reels, however, the roller bearings 40 are not necessary.

As mentioned above the split bell 16 is provided over the tail plate 26 to protect the internal mechanism. The split bell also serves as a guide for the line in the casting mode, the opening 14 operating to guide the line 12 while it is unwinding from the spool 18. The split bell 16 also includes a slot 58 through which the line 12 can pass when transferring to and from the casting mode. The split bell 16 is connected to the tail plate 26 by the spring clip 60 which provides a frictional engagement with the inner surface. The openings 62 are provided so that the fisherman can observe the interior of the split bell 16.

In operation, in order to place the reel 10 in the casting mode all that needs to be done is to thread the line 12 from its position shown by the broken lines in FIG. 1 through the slots 34 and 58 into the opening 14. As shown in FIG. 1, while preparing for the cast the thumb should be placed on the spool 18, pressing the bearing surface 38 against the roller bearings 40 to prevent the line 12 from unwinding. When the fisherman is ready to cast, the thumb is removed from the spool 18 and a normal cast is executed. When the cast is completed, the thumb is placed once again on the spool 18 to prevent the line 12 from playing out any further.

In order to place the line 12 back into the trolling position, shown by the broken lines in FIG. 1, the line 12 is threaded back through the slots 58 and 34 so that the line 12 will once again be in a position perpendicular to the spool axis. Should a fish engage the line 12 and exert a force perpendicular to the spool axis, the flexible bearing described above will operate to allow the spool 18 to move so that the bearing surface 38 will engage the roller bearings 40 and thus provide bearing surfaces on both sides of the spool 18.

Figure 5:
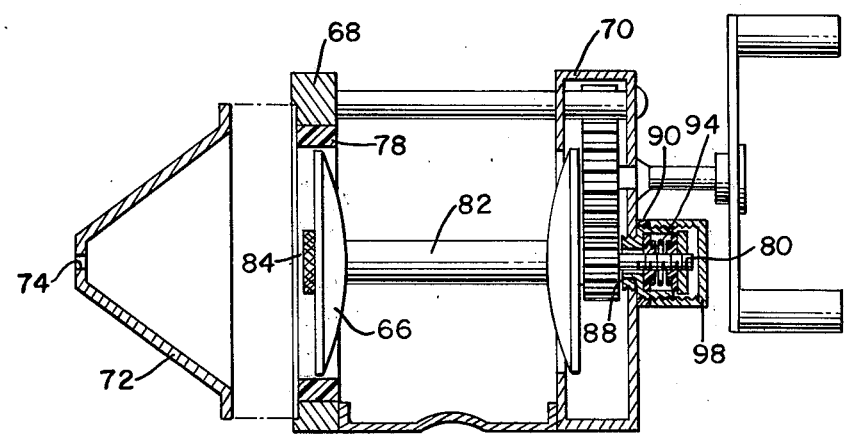
FIG. 5 is a cross-sectional view of the reel of FIG. 4 showing in particular a flexible bearing with a rubber spring insert.
Figure 6:
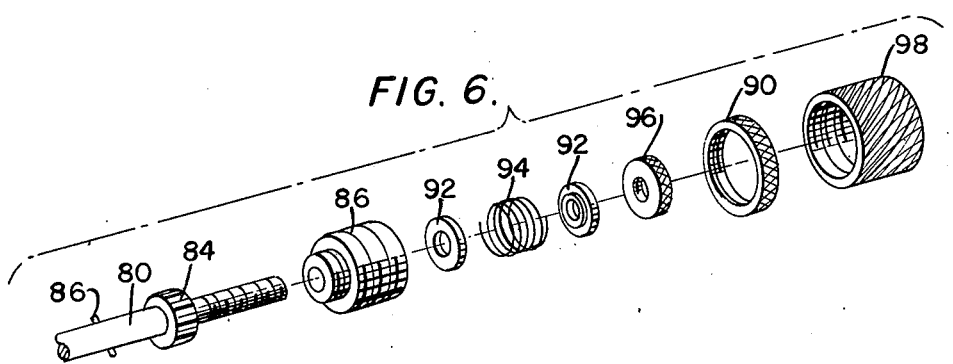
FIG. 6 is an exploded perspective view of the flexible bearing of FIG. 5.

FIGS. 4–6 illustrate another embodiment of the invention. There are several notable differences between this embodiment and the one shown in FIGS. 1–3. First, instead of utilizing a flexible bearing with a rubber insert, a flexible bearing with a spring is used. Second, instead of providing roller or other types of bearings on the side of the spool opposite the flexible bearing, no such bearings are included. No such bearings are necessary in the lighter weight reels.

Referring specifically to FIGS. 4 and 5, a reel 64 includes a spool 66, tail plate 68 and end plate 70 similar in design to those described above in connection with FIGS. 1–3. A split bell 72 is provided which is of a different shape than the one shown in FIGS. 1 and 2 and is attached to the tail plate 68 by screws instead of a friction fit, but functions in a manner identical to that described above. The split bell includes an opening and guide 74 through which the fishing line can move when the reel is in the casting mode after the line has been transferred through the slot 76 as described above.

As shown in FIGS. 4 and 5, the inner surface of the tail plate 68 is provided with a Teflon insert 78 which, when the spool 66 is in its normal axial position, provides a small space which is large enough so that the fishing line can freely move through it but small enough so that a slight movement of the spool 66 will touch the Teflon insert and prevent the fishing line from unwinding further.

The other notable difference between the embodiment of FIGS. 4-6 and the one in FIGS. 1-3 is that a different type of flexible bearing is provided. As shown best in FIGS. 5 and 6, the spool 66 includes a shaft 80 which passes through a hollow rod 82 which connects the two end portions of the spool together. The shaft 80 is threaded (not shown) on the side of the split bell 72 to accommodate a nut 84 for holding the shaft 80 in place. On the other side of the shaft 80, a gear 84 is rigidly connected to the shaft and located to mesh with any other gearing which can be used to turn the spool 66. A pin 86 is provided to engage the inner surface of the spool so that rotation of the shaft will in turn rotate the spool.

A bushing 86 is provided which threadedly engages an opening 88 located in the end plate assembly 70, the outer surface of the outer portion of the bushing 86 also being threaded to accommodate a ring nut 90 as shown in FIG. 5 for holding the bushing 86 in place. As shown best in FIG. 5, a space is located between the inner surface of the bushing 86 and the shaft 80 so that the shaft can move relative to its axis as will be described below. The remainder of the flexible bearing includes a pair of Teflon washers 92, a spring 94, and a nut 96 which engages an outer threaded surface of the shaft 80 for holding the spring 94 in place. A cap 98 is also provided for covering the flexible bearing to keep out dirt.

As can be seen, the nut 96 maintains the spring 94 in compression and holds the shaft 80 in its normal axial position until pressure is exerted on the spool 66, for example, by pressing the thumb on fishing line wound on the spool, which causes the shaft to move until the outer surface of the spool on the side opposite the flexible bearing to engage the Teflon ring 78. When the pressure is withdrawn, the spring 94 will cause the spool to return to its normal axial position shown in FIG. 5.

As can be seen, the changeover from the trolling to casting and vice versa can be done quickly and easily, simply by threading the line through an opening. No other adjustments are necessary. A further advantage of the inventive combination reel is that for a complete breakdown of the reel for cleaning purposes all that needs to be done is to unscrew the nuts on both sides of the spool. In this way the spool and flexible bearing assembly can easily be removed. As can be seen in FIGS. 2 and 4, the split bell 16 can easily be removed simply by disengaging the friction fit with a spring clip or screws, whichever is used. A significant advantage of this easy breakdown is that interchangeable spools can be provided with different weight lines for different fishing conditions. Thus, it can be seen that the inventive combination reel in addition to being structurally simple offers much greater versatility than those reels in the prior art.

It should be understood that only preferred embodiments of the invention have been described and shown and that one with ordinary skill in the art will be able to make modifications and changes within the scope of the invention and that all such modifications and changes are contemplated as being encompassed by the appended claims.

I claim:

1. A fishing reel adapted to be shifted between casting and trolling modes comprising:
    a housing, a spool adapted for rotation about an axis relative to the housing, the spool including a line portion around which fishing line can be wound, rotating means for rotating the spool, first bearing means for rotatably mounting the spool on the housing on one side of the line portion, the spool on the other side of the line portion being spaced from the housing at a distance at least wide enough to accommodate a strand of fishing line, the first bearing means including means for accommodating movement of the spool between its normal axial position to a second position where a portion of the spool on the other side of the line portion will engage the housing when pressure is exerted on the spool and return to said normal position when the pressure is relieved, the housing including an opening therein located to allow the fishing line to be shifted between the trolling mode whereby line projects from the spool generally perpendicular to the spool axis and the casting mode whereby the line can unwind generally axially from the spool through the space between said other side of the line portion and the housing when the spool is in its normal axial position.

2. The fishing reel in claim 1, wherein the movement accommodating means includes a rubber bearing means for engaging the spool.

3. The fishing reel in claim 2, wherein the first bearing means further includes a bushing connected to the housing, a space between the inner surface of the bushing and the spool, a spacer connected to the outer surface of the bushing for holding the rubber bearing means in place, the outer end of the spool being threaded, and a cooperating nut on the outer end of the spool.

4. The fishing reel in claim 1, wherein the means for accommodating movement includes a spring means for engaging the spool.

5. The fishing reel in claim 4, wherein the first bearing means includes a bushing connected to the housing, a space between the inner surface of the bushing and the spool, spring means engaging the outer end of the bushing, nut means connected to the spool and engaging the outer end of the spring means for compressing and holding the spring means in place.

6. The fishing reel in claim 1, and further including a second bearing means including normally spaced apart cooperating bearing surfaces on said other side of the line portion and the housing, which bearing surfaces will engage each other when pressure is exerted on the spool.

7. The fishing reel in claim 6, wherein the second bearing means includes a plurality of roller bearings spaced apart on the housing and a bearing surface located on the spool.

8. The fishing reel in claim 7, and further including a bell shaped protective cover connected to the housing for covering the second bearing means, the cover including a slot therein through which the fishing line can pass, the cover further including guide means including an opening in the end of the bell which communicates with the slot.

9. The fishing reel in claim 1, wherein the portion of the housing in proximity to the spool on said other side of the line portion includes a Teflon insert.

* * * * *